Sept. 29, 1959  K. H. WILCOXON  2,906,992
TOWED HYDROPHONE
Filed May 23, 1957
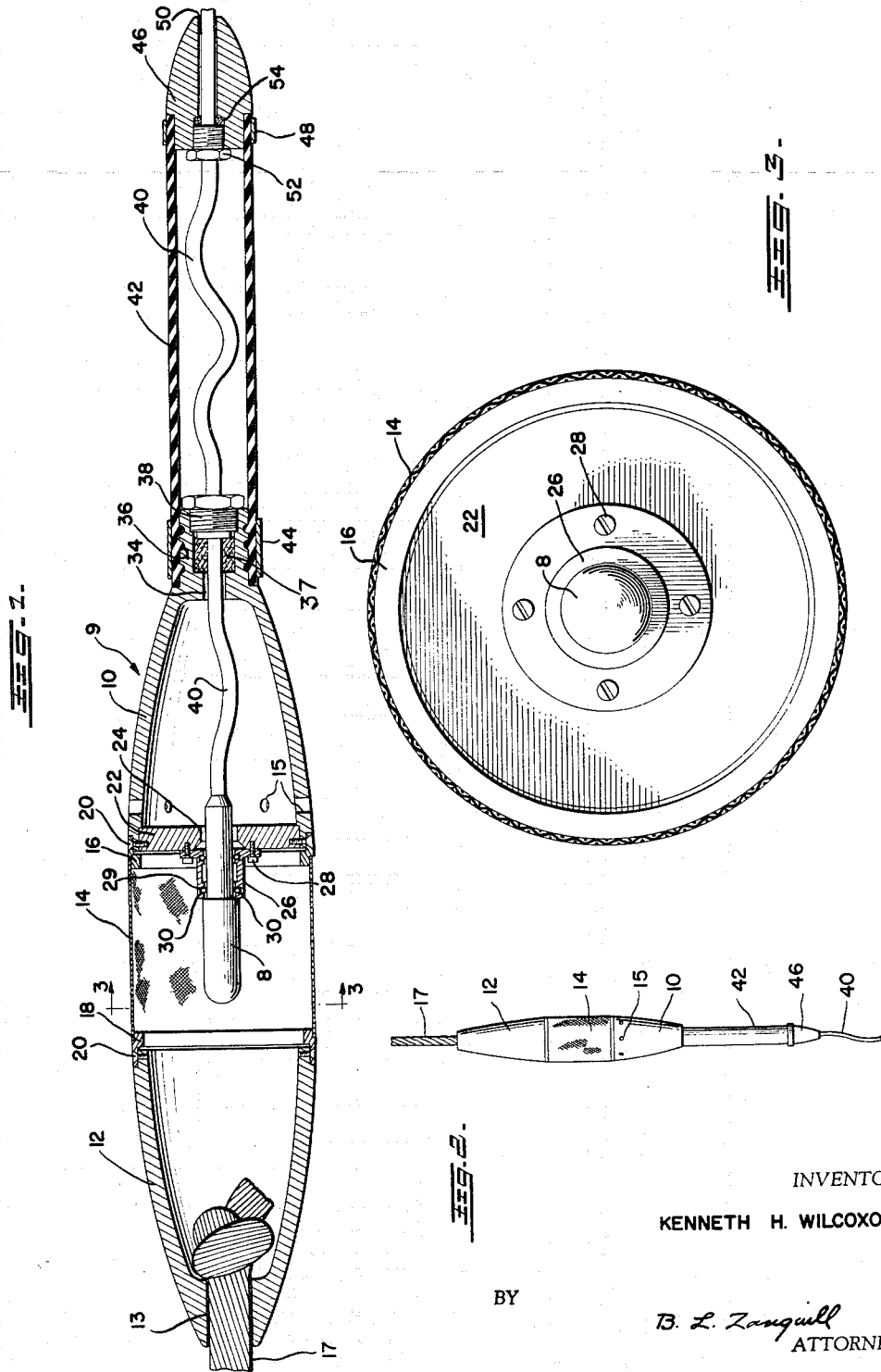
INVENTOR
KENNETH H. WILCOXON
BY
B. L. Zangwill
ATTORNEY United States Patent Office 2,906,992
Patented Sept. 29, 1959

2,906,992
TOWED HYDROPHONE

Kenneth H. Wilcoxon, Cabin John, Md., assignor to the United States of America as represented by the Secretary of the Navy Application May 23, 1957, Serial No. 661,267

4 Claims. (Cl. 340—8)

(Granted under Title 35, U.S. Code (1952), sec. 266)

The invention described herein may be manufactured and used by or for the Government of the United States of America for governmental purposes without the payment of any royalties thereon or therefor.

This invention relates to a method and means for measuring the self-noise of a ship or the like while it is under way, and more particularly to a towable hydrophone and an enclosure therefor.

A prior art method of measuring the self-noise of a ship while it is under way consists of providing a listening ship, which is anchored or adrift, with hydrophones suspended therefrom, and having the ship to be measured pass by said suspended hydrophones, and measure its noise as it moves past said hydrophones. This prior art method has the disadvantage that it makes possible the measurement of ship self-noise only when said ship is passing the suspended hydrophones. Further, the exact distance of the passing ship from the hydrophones is difficult to determine, which presents a further problem, since this distance is a prime factor in the making of noise measurements. An additional disadvantage resides in the fact that it takes a long time to make a suitable set of measurements because of the small percentage of time that said measurements can be made, since the ship being tested passes out of range in a relatively short time.

It is an object of this invention to provide a means for overcoming the foregoing disadvantages of the prior art method and apparatus.

It is another object of this invention to provide a method whereby the self-noise of a moving ship may be determined.

It is an additional object of this invention to provide a method whereby the self-noise of a moving ship may be determined without the use of a separate listening ship.

It is a further object of this invention to provide a method whereby the self-noise of a moving ship may be determined over extended intervals of time without the aid of supplementary listening vessels.

It is still an additional object of this invention to provide a means for determining the self-noise of a moving ship without the use of a separate listening ship.

It is still another object of this invention to provide a means for reducing the self-noise of a towed hydrophone caused by the turbulent water flow over said hydrophone.

It is still a further object of this invention to provide a means whereby the self-noise of a moving ship may be determined over extended intervals of time.

In accordance with this invention a towable, hollow ellipsoidal enclosure is provided for a hydrophone. The hollow enclosure is provided with a plurality of openings so that said enclosure may become flooded with the water in which it is immersed, whereby the hydrophone within the enclosure is surrounded by the water through which it is being towed. This arrangement provides a means for surrounding a hydrophone with the water through which it is being towed, yet provides a means for reducing the turbulence of the water flow over the hydrophone. The hydrophone enclosure is provided with an elastic sleeve having one end attached to the front end of the hydrophone enclosure, the other end of said sleeve in turn being clamped to the electrical cable by which said enclosure and hydrophone are towed through the water. The elastic sleeve acts as a means for isolating the hydrophone from vibrations in the electrical cable extending from the hydrophone to the towing vessel.

Additional objects and many of the attendant advantages of this invention will be readily appreciated as the same becomes better understood by reference ot the following detailed description when considered in connection with the accompanying drawings wherein:

Fig. 1 is a view, partly broken away of a preferred embodiment of this invention; and Fig. 2 is a longitudinal sectional view of the hydrophone and hydrophone enclosure in accordance with this invention; and Fig. 3 is a transverse sectional view taken in line 3—3 of Fig. 1.

Referring now to the drawings, wherein like reference characters designate like or corresponding parts throughout the several views, there is shown in Fig. 1, a longitudinal sectional view of a preferred embodiment of a towable hydrophone and enclosure therefor. The device comprises a hydrophone 8 enclosed within a substantially ellipsoidal enclosure 9. The hydrophone enclosure 9 comprises a nose section 10 and a tail section 12 having a hole 13 extending through the rear end thereof. The nose section 10 is provided with a plurality of holes 15 to allow flooding of said section 10 when the enclosure 9 is submerged.

A rope 17 that acts as a stabilizer for the hydrophone enclosure 9, extends from the hole 13 in the rear end of said enclosure, and has one end anchored within the tail section 12. The rope 17 is normally about ten times the length of the enclosure 9, and trails behind it when said enclosure is towed through the water. The rope 17 is used as a stabilizer, instead of using conventional stabilizing fins, since such fins tend to cause rotation of the hydrophone enclosure about its longitudinal axis, thereby causing twisting of the hydrophone towing cable.

Further, it is pointed out that in a rope, or the like, that is undergoing a whipping motion, as might be the case in a hydrophone towing cable, there is a sharp snap at the end of said rope. It should therefore be noted that by not placing the hydrophone enclosure 9 at the end of the tow line, any snap in said line will occur at the end of rope 17, and not at the hydrophone enclosure 9; this arrangement reduces the self-noise of the hydrophone and also reduces the strain on the parts thereof.

A perforate cylindrical sleeve 14 is interposed between the nose section 10 and the tail section 12, said cylindrical sleeve having its forward end attached to the rear end of the nose section and its rear end attached to the forward end of the tail section. The perforate sleeve 14 is made of expanded metal, screening or the like, and has attached to its respective ends, by welding or the like, ring members 16 and 18. The respective ring members 16 and 18 are in turn attached to the nose section 10 and the tail section 12 by means of suitable screws of the like 20. It is pointed out that a perforate "sound window" 14 of the type described, produces far less noise as water flows over it, than does an imperforate one, since the flow of water over the perforate member causes less vibration of said member, than does the flow of water over an imperforate member. This feature of the applicant's device serves to produce a hydrophone combination having less self-noise than similar devices used heretofore.

A circular plate 22, having the same outside diameter as the inside diameter of the nose section 10, is attached to said nose section at the rear thereof, being held in place by means of the screws 20. The circular plate 22 is provided with a hole 24 at the center thereof and passing therethrough. The hydrophone 8 is mounted on a suitable sleeve member 26 which in turn is bolted to the circular plate 22 by screws 28. One end of the hydrophone 8 extends through the sleeve 26 and the hole 24 in the plate 22. The interior of the sleeve 26 is provided with annular grooves 29, which in turn contain O-rings 30 that act as a shock insulating means between the hydrophone 8 and said sleeve 26, and hydrophone enclosure 9.

A nipple 34 is integrally formed on the forward end of the nose section 10, said nipple having an opening extending therethrough and communicating with the interior of nose section 10. The forwardmost portion of the opening in the nipple is provided with suitable screw threads, and the exterior of the nipple 34 is provided with a series of grooves or serrations 36. An externally threaded nut 38 is screwed into the interior of the nipple 34, and a combination electrical lead and towing cable 40 extends from the hydrophone 8 through the nose section 10, and through a hole provided in the nut 38.

A sealing gland 37 is provided within the nipple 34, in cable surrounding position, said gland 37 being subject to compression by the nut 38 so as to form a water-tight seal at the forward end of the enclosure 10.

An elastic tubular member 42, made of rubber or the like, has one end attached to the exterior of the nipple 34, being held in place by a band 44 or the like, clamped about said tubular member 42. A substantially conical sleeve member 46 has a rear portion thereof inserted within the other end of the tube 42, the tube 42 being retained about the rear portion of sleeve 46 by a suitable clamping ring 48. The conical sleeve 46 has a hole 50 extending through the length thereof, the rearmost portion of said hole being enlarged and provided with screw threads. The electrical lead or cable 40 extends from the forward end of the nose section 10, through the tube 42 and in turn through an externally threaded nut 52 that is screwed into the threaded portion of the hole 50 in sleeve 46. A rubber sealing gland 54 is provided within the enlarged portion of the hole 50 in sleeve 46 between the forward end of the nut 52 and a shoulder provided in said hole 50. When the nut 52 is screwed into the threaded hole in sleeve 46 it compresses the rubber gland 54, tightening the same about the cable 40, thereby preventing movement of said cable relative to the sleeve 46 and nut 52. The tightening of the gland 54 about cable 40 also serves to prevent entrance of water into the tubular member 42, through the hole 50.

It is pointed out that when the elastic tube 42 is not under tension, the portion thereof between the nut 38 and nut 52 is of less length than the cable 40 extending between the nuts, thus the elastic tube 42 serves as a shock-absorbing member to isolate the hydrophone 8 against the continual vibration of the cable 40, thereby reducing the self-noise of the hydrophone.

When the hydrophone enclosure 9 is towed through the water, said enclosure becomes flooded by entrance of water through the perforate sleeve 14 and the holes 15 in the forward section 10, whereby the hydrophone 8 is placed in intimate contact with the water through which it is being towed. It is pointed out that the sound detection capabilities of a hydrophone are improved when the hydrophone is in intimate contact with the same medium as that through which the sound waves travel prior to their impingement upon said hydrophone.

It is pointed out, that, by virtue of the construction of the applicant's device the turbulence of flow over a towed hydrophone is materially reduced, thereby materially decreasing the self-noise of the hydrophone. A decrease in hydrophone self-noise makes possible a considerably more accurate determination of the self-noise of a moving ship, or other body, the self-noise of which it is desired to determine.

Since the device described above may be towed by a ship, it is possible for the ship to determine its own self-noise over an extended period of time, or after suitable compensation for the noise of the towing ship, the noise of an adjacent moving ship may be determined with this device. The applicant's device has further utility in that it can be towed by a mine sweeper utilized for setting off acoustic mines, for the purpose of monitoring the field of mine detonating sound generated by said mine sweeper. Furthermore, by use of the applicant's device, only one ship, namely the one being tested, is needed in the determination of the self-noise of such a ship while it is under way, thereby speeding up the noise determinations and also reducing the man power and equipment necessary to make such self-noise determinations. It is also pointed out that this device may be utilized in making noise measurements on a submerged submarine.

Obviously many modifications and variations of the present invention are possible in the light of the above teachings. It is therefore to be understood that within the scope of the appended claims the invention may be practiced otherwise than as specifically described.

What is claimed is:

1. A towable underwater sound detecting device of the class described, comprising a hollow ellipsoidal member, a hydrophone carried within said hollow member, said hollow member comprising a nose section, a tail section, and a cylindrical, perforate center section joined to the rear end of said nose section and to the forward end of said tail section; the tail section having a length of flexible material extending rearwardly therefrom, said flexible material being several times longer than said ellipsoidal member.

2. A towable underwater sound detecting device as set forth in claim 1, further comprising a combination electric lead and towing cable means extending from said hydrophone, through said nose section and out of a hole provided in the forward end of said nose section; said cable being connected to a listening device aboard a ship.

3. A towable underwater sound detecting device comprising a hollow ellipsoidal member comprising a nose section, a tail section, an intermediate perforate section between said nose section and said tail section, a hydrophone carried within said intermediate perforate section and connected to said nose section, a hole provided in the forward end of the nose section, a nipple member affixed to the forward end of said nose section and having a hole extending therethrough connectin with the hole in the nose section; a combination electrical cable and towing means extending from said hydrophone through said nipple to the exterior of the hollow member, a sleeve member fixedly mounted on said cable and spaced forwardly of the nose section; an elastic member having one end connected to said nipple and the other end connected to said forwardly spaced sleeve, said elastic member, in its unstretched condition being of less length than that portion of electrical cable between said nipple and said sleeve, whereby said elastic member forms a shock-absorbing means for preventing transmission of cable vibration to the hydrophone.

4. A towable underwater sound detecting means comprising a hollow ellipsoidal member, a hydrophone carried within said hollow member, said hollow member comprising a nose section, a tail section, and a perforate center section interposed between said nose section and said tail section, said hydrophone being located within said perforate center section; an electrical cable extending from said hydrophone and through the forward end of the nose section through a hole provided in said forward end, a sleeve fixedly mounted on said cable and spaced forwardly of the forward end of the nose section, a tubular elastic member having one end affixed to the forward end of the nose section and its other end affixed to said sleeve member, said tubular elastic member, in its unstretched condition, being of less length than the length of cable between the forward end of the nose section and said sleeve, whereby said elastic tubular member acts as a shock-absorbing means to prevent transmission of vibration from the towing cable to hydrophone.

References Cited in the file of this patent

UNITED STATES PATENTS

| | | |
|---|---|---|
| 793,896 | Mundy | July 4, 1905 |
| 1,470,733 | Hayes | Oct. 16, 1923 |
| 2,272,213 | Lear | Feb. 10, 1942 |
| 2,401,929 | Hammond | June 11, 1946 |
| 2,405,187 | Benioff | Aug. 6, 1946 |
| 2,440,903 | Massa | May 4, 1948 |
| 2,681,442 | Schurman | June 15, 1954 |
| 2,783,449 | Loofbourrow | Feb. 26, 1957 |
| 2,847,655 | Schurman | Aug. 12, 1958 |